United States Patent
Naritomi et al.

(10) Patent No.: US 8,322,013 B2
(45) Date of Patent: Dec. 4, 2012

(54) METHOD FOR MANUFACTURING COMPOSITE WITH HIGH CORROSION RESISTANCE

(75) Inventors: Masanori Naritomi, Tokyo (JP); Naoki Andoh, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 837 days.

(21) Appl. No.: 12/517,578

(22) PCT Filed: Dec. 5, 2007

(86) PCT No.: PCT/JP2007/073526
§ 371 (c)(1),
(2), (4) Date: Jun. 4, 2009

(87) PCT Pub. No.: WO2008/069252
PCT Pub. Date: Jun. 12, 2008

(65) Prior Publication Data
US 2010/0018025 A1    Jan. 28, 2010

(30) Foreign Application Priority Data
Dec. 6, 2006 (JP) ................. 2006-329410

(51) Int. Cl.
B32B 15/04 (2006.01)
(52) U.S. Cl. ............ 29/458; 29/889; 428/461; 428/458; 428/457
(58) Field of Classification Search ............ 29/889, 29/458; 428/457, 458, 461
See application file for complete search history.

(56) References Cited

U.S. PATENT DOCUMENTS
2006/0127684 A1 * 6/2006 Naritomi et al. ............. 428/457

FOREIGN PATENT DOCUMENTS
JP 2001-192854 A 7/2001
JP 2003-286582 A 10/2003
JP 2005-342895 A 12/2005

OTHER PUBLICATIONS

Phosphate Permanganate: A Chrome Free Alternative for Magnesium Pre-treatment by Skar el al (Magnesium Alloys and their Applications, Online ISBN 9783527607556; May 15, 2006, http://onlinelibrary.wiley.com/book/10.1002/3527607552.*
International Search Report of PCT/JP2007/073526, Mailing Date of Feb. 26, 2008.

* cited by examiner

*Primary Examiner* — David Bryant
*Assistant Examiner* — Moshe Wilensky
(74) *Attorney, Agent, or Firm* — Westerman, Hattori, Daniels & Adrian, LLP

(57) ABSTRACT

A composite of a magnesium part or a magnesium alloy part and a resin composition, improved to have high corrosion resistance, is manufactured by: a step of shaping a magnesium alloy part 1 from a casting or an intermediate material; a step of immersing and chemically etching the shaped part in an acidic aqueous solution; a step of immersing the chemically etched shaped part in an aqueous solution containing potassium permanganate and forming on the surface thereof a thin layer having manganese oxide as a component; a step of inserting the part, on which the thin layer has been formed, into a metallic mold for injection molding and injecting into the mold a resin composition selected out of a resin composition whose main component is polyphenylene sulfide, a resin composition whose main component is a polybutylene terephthalate resin and a resin composition whose main component is an aromatic polyamide resin and then integrally affixing the magnesium alloy part 1 and the resin composition 4; and a step of subjecting the integrally affixed composite 7 to a chemical conversion treatment by immersing it again in a magnesium alloy chemical conversion treatment solution.

3 Claims, 1 Drawing Sheet

METHOD FOR MANUFACTURING COMPOSITE WITH HIGH CORROSION RESISTANCE

FIELD OF THE INVENTION

The present invention relates to a method for manufacturing a highly corrosion resistant composite, in which a magnesium part or a magnesium alloy part and a resin composition have been integrated and which is used for the housings of electronic equipments, the housings of consumer electrical equipments, structural parts, mechanical parts and so forth. More specifically, the present invention relates to a method for manufacturing a highly corrosion resistant composite, in which a resin composition is integrated with a magnesium part or magnesium alloy part formed by machining and relates to a method for manufacturing a highly corrosion resistant composite, in which a magnesium part or a magnesium alloy part and a resin composition have been integrated and which is used, for example, in various mobile electronic equipments, consumer electrical equipments, medical instruments, automotive structural parts, automotive mounted parts, architectural material parts and other structural parts, exterior trim parts and so forth.

BACKGROUND OF THE INVENTION

Technology for integrating metals and resins is needed in many different fields, such as in manufacturing of parts for automobiles, consumer electric products and industrial devices, and many adhesive agents have been developed for this purpose. Some of these adhesives are known to be very excellent. For example, adhesives that exhibit their function at normal temperature or with heating are used to integrally join metals and synthetic resins and this joining method is at present a common method for integrating composites composed of metals and synthetic resins.

On the other hand, more rational joining methods that do not involve the use of an adhesive have been studied heretofore. An example is a method in which a high-strength engineering plastic is integrated with a light metal such as magnesium, aluminum, an alloy of these or an iron alloy such as stainless steel without any adhesive. For instance, there has been proposed a method in which a shaped metal that has undergone surface treatment is inserted into a metallic mold, a thermoplastic resin is injected into the mold and the two are integrated, that is, a method based on a technique for utilizing injection molding technology to join a resin and a metal as a different material. This technology will be referred to as "injection joining" hereinafter. A known method for injection joining is to perform injection molding using a polybutylene terephthalate resin (hereinafter referred to as PBT) or a polyphenylene sulfide (hereinafter referred to as PPS) on an aluminum alloy (see Japanese Patent Application Laid-open 2004-216425: Patent Document 1, for example). Another known joining technique is to form relatively large holes in an anodized film on a piece of aluminum and make a synthetic resin protrude into the holes thus causing joint to be attained there (see WO/2004-055248 A1: Patent Document 2, for example).

The principle behind this injection joining in Patent Document 1 can be considered as follows. An aluminum alloy is immersed in a dilute aqueous solution of a water-soluble amine compound, the aluminum alloy is finely etched with a weakly basic aqueous solution and at the same time the amine compound molecules are adsorbed to the surface of the aluminum alloy. After undergoing this treatment, the aluminum alloy is inserted into a metallic mold for injection molding and a molten thermoplastic resin is injected under high pressure.

Here, the amine compound molecules adsorbed to the surface of the aluminum alloy encounter the thermoplastic resin to generate heat and the resin, which was apt to be quenched and solidified by contact with the aluminum alloy held at a low temperature of the mold, is not solidified as quickly and gets into ultrafine recesses on the aluminum alloy surface. As a result of this, with a composite composed of an aluminum alloy and a thermoplastic resin, the thermoplastic resin is securely joined without being separated from the aluminum alloy surface. That is, when an exothermic reaction occurs, a strong injection joining is produced. It has actually been confirmed that PBT and PPS, which can be exothermically reacted with an amine compound, can be joined by injection joining to an aluminum alloy.

The inventors have developed a resin composition that is suited to injection joining in order to make the above-mentioned technologies more effective and, specifically, made a further advancement and improvement on a technique of forming countless fine recesses in a metal surface prior to bonding. As a result, it was confirmed that a composition whose properties related to the crystallinity of PPS have been changed is particularly effective, rather than a simple PPS composition obtained merely by matching the linear coefficient of expansion to that of an aluminum alloy. That is, the inventors investigated whether the limitations of the pretreatment method required for metal parts could be reduced by making an advancement on the above-mentioned technologies and improving the resin composition parts and, as a result, discovered that the joint strength between a metal part and a resin composition part is further raised in a composite composed of a metal part and a resin composition part having a specific PPS composition, PBT composition or polyamide composition. The inventors found that, using this improved resin composition group, injection joining can be obtained not only with aluminum alloys but also with magnesium alloys, for example. The present invention relates to a technique for the injection joining of a hard resin to a magnesium alloy.

Let us touch briefly on the characteristics of magnesium alloys. The most prominent feature of magnesium alloys is that they are the lightest in weight of all practical metals and have a specific gravity close to 1.7, which is of lower value even compared to aluminum alloys (specific gravity of 2.7) touted for being so lightweight. On the other hand, however, they are more difficult to handle than aluminum alloys because they are far more chemically active. Specifically, with a magnesium alloy, immediately after a bare metal surface has been exposed by grinding or the like, oxygen in the air starts forming a natural oxidized layer and furthermore the stability and strength of this natural oxidized layer are markedly inferior to those of aluminum alloys. The natural oxidized layer of an aluminum alloy is known to be stable so that, as long as there is a rust preventing oil film or a paint film over this natural oxidized layer, the layer will remain stable for ten years or longer when left indoors where there is no condensation or the like. However, a magnesium alloy in the same environment will begin to swell or rust in less than a year. Molecules of carbon dioxide or water, diffusing through and penetrating the oil or paint film, pass through them reacting with the natural oxidized layer of the magnesium.

In other words, when a magnesium alloy is actually used, it has to be covered first with a tough film taking the place of a natural oxidized film. More specifically, the magnesium alloy is treated by chemical conversion treatment or electrolytic oxidation. The inventors confirmed at first that a specific resin composition could be joined by injection joining to a magnesium alloy that had undergone chemical conversion treatment but the result was still not good enough in all respects to be put to practical and commercial application. Specifically, there was such a problem that a chemical conversion treatment that would yield the best joint strength by injection joining does not have so good corrosion resistance as the product of the chemical conversion treatments currently in use.

SUMMARY OF THE INVENTION

The present invention was conceived in an effort to boost injection joining strength and solve the above-mentioned problems and achieves the following objects.

It is an object of the present invention to provide a method for manufacturing a highly corrosion resistant composite in which a magnesium part or a magnesium alloy part is integrated with a resin composition with sufficiently good joint strength.

It is another object of the present invention to provide a method for manufacturing a highly corrosion resistant composite in which a composite, in which a resin composition is integrated with a magnesium part or a magnesium alloy part, will have corrosion resistance comparable to that of a magnesium alloy that has undergone an existing chemical conversion treatment.

The present invention adopts the following means for achieving the stated objects.

Specifically, the method for manufacturing a composite with high corrosion resistance according to present invention 1 comprises:

a step of forming a shaped part by machining a magnesium part or magnesium alloy part from a casting or an intermediate material;

a step of immersing and chemically etching said shaped part in an acidic aqueous solution;

a step of immersing said chemically etched shaped part in an aqueous solution containing a permanganate and forming on the surface thereof a thin layer having manganese oxide as a component; and a step of inserting said shaped part, on which the thin layer has been formed, into a metallic mold for injection molding mold and injecting a resin composition into said mold to integrally affix said shaped part and resin composition, said resin composition being selected out of:

a resin composition comprising a resin component including polyphenylene sulfide by 70 to 97 wt % and polyolefin resin by 3 to 30 wt %, a resin composition comprising a resin component including polybutylene terephthalate resin by 70 to 97 wt % and polyethylene terephthalate resin and/or polyolefin resin by 3 to 30 wt % and a resin composition comprising a resin component including as the main component an aromatic polyamide resin containing both a polyamide obtained from hexamethyldiamine and isophthalic acid and a polyamide obtained from hexamethylenediamine and terephthalic acid.

The method for manufacturing a composite with high corrosion resistance according to present invention 2 comprises:

a step of forming a shaped part by machining a magnesium part or magnesium alloy part from a casting or an intermediate material;

a step of immersing and chemically etching said shaped part in an acidic aqueous solution;

a step of immersing said chemically etched shaped part in an aqueous solution containing a permanganate and forming on the surface thereof a thin layer having manganese oxide as a component;

a step of inserting the shaped part, on which the thin layer has been formed, into a metallic mold for injection molding and injecting a resin composition into said mold to integrally affix said shaped part and resin composition, said resin composition being selected out of:

a resin composition comprising a resin component including polyphenylene sulfide by 70 to 97 wt % and polyolefin resin by 3 to 30 wt %, a resin composition comprising a resin component including polybutylene terephthalate resin by 70 to 97 wt % and polyethylene terephthalate resin and/or polyolefin resin by 3 to 30 wt % and a resin composition comprising a resin component including as the main component an aromatic polyamide resin containing both a polyamide obtained from hexamethyldiamine and isophthalic acid and a polyamide obtained from hexamethylenediamine and terephthalic acid; and a step of subjecting said integrally affixed shaped part and resin composition to a chemical conversion treatment by immersing the same in a magnesium alloy chemical conversion treatment solution.

The method for manufacturing a composite with high corrosion resistance according to present invention 3 comprises:

a step of forming a shaped part by machining a magnesium part or magnesium alloy part from a casting or an intermediate material;

a step of immersing and chemically etching said shaped part in an acidic aqueous solution;

a step of immersing said chemically etched shaped part in an aqueous solution containing a permanganate and forming on the surface thereof a thin layer having manganese oxide as a component;

a step of inserting the shaped part, on which the thin layer has been formed, into a metallic mold for injection molding and injecting a resin composition into said mold to integrally affix said shaped part and resin composition, said resin composition being selected out of:

a resin composition comprising a resin component including polyphenylene sulfide by 70 to 97 wt % and polyolefin resin by 3 to 30 wt %, a resin composition comprising a resin component including polybutylene terephthalate resin by 70 to 97 wt % and polyethylene terephthalate resin and/or polyolefin resin by 3 to 30 wt % and a resin composition comprising a resin component including as the main component an aromatic polyamide resin containing both a polyamide obtained from hexamethyldiamine and isophthalic acid and a polyamide obtained from hexamethylenediamine and terephthalic acid; and a step of subjecting said integrally affixed shaped part and resin composition to a chemical conversion treatment by immersing the same in a manganese phosphate-based or silicon-based magnesium alloy chemical conversion treatment solution.

These means will now be described in detail.

[Magnesium Part, Magnesium Alloy Part]

The magnesium or magnesium alloy used in the present invention encompasses all commercially available magnesium or magnesium alloys, including wrought alloys such as AZ31 or others and casting alloys such as AZ91 or others. For a casting alloy or the like, the shaped part can be a part, which has been shaped by die casting, thixo-molding, injection molding or other such means, or a part in which the shape of one of these has been further trimmed by machining. A wrought alloy or the like can be a sheet material, other intermediate material or a part that has been shaped by subjecting one of these to hot pressing or other such machining.

The magnesium or magnesium alloy used in the present invention has on its surface a thin film whose main component is manganese oxide. Usually, the surface treatment applied for a magnesium alloy to improve its corrosion resistance involves immersing magnesium or a magnesium alloy, which has a strong tendency for ionization and readily undergoes corrosive oxidation even in air, in an aqueous solution of an acid or salt of a heterogeneous metal, thereby forming on the surface a stable layer of metal phosphorus oxide, a metal carbon oxide, or a metal oxide containing a heterogeneous metal, so that the presence of this layer prevents corrosion of the internal metal. In the metal industry, an immersion type of such surface treatment is called a chemical conversion treatment and the present invention makes use of a method that is included in chemical conversion treatment.

The phrase "chemical conversion treatment" is generally used to include chemical etching or degreasing performed prior to the actual chemical conversion treatment. So as to avoid confusion in the present invention, the phrase "chemical conversion treatment" will indicate a treatment defined in the narrow sense of forming an anticorrosion layer, so the degreasing, etching and other such treatments normally performed before this will be called "pretreatment", the actual treatment, including the chemical conversion treatment, for producing a chemical conversion film will be called the "main treatment" and everything including pretreatment and main treatment will be called "liquid treatment."

One chemical conversion treatment that has long been known as a way to subject magnesium or a magnesium alloy to a chemical conversion treatment is to immerse the metal in an aqueous solution containing chromic acid and provide the surface with an anticorrosive layer whose main component is chromium oxide or a phosphorous oxide of chromium and this is generally called a chromate treatment. This chromate treatment is known from U.S. Pat. No. 2,438,877 and others. Recently a treatment has been widely used which involves immersing metals in a mixed aqueous solution of a manganese salt and phosphoric acid or the like to provide an anticorrosive layer whose main component is manganese phosphate.

A chemical conversion treatment in which a metal salt other than chromium is used is called a non-chromate treatment, while phosphate, silicate, stannic acid, fluoride and other such treatments are known in addition to the use of manganese phosphate. Metals that have been tried include manganese, aluminum, calcium, vanadium, zinc, zirconium, titanium and so on, while methods for providing a layer composed of oxides, phosphorus oxides of these or composites of these have also been disclosed. Examples include the disclosures in Japanese Patent Applications Laid-open Nos. H5-230669, H7-126858, 2001-123274, 2000-096255, 2000-199077 and so on.

Chromate treatment has long been used as a treatment method that affords excellent corrosion resistance but hexavalent chromium, which is said recently to pose environmental problems in its frequent use, is no longer used for treatment solutions. Accordingly, there is a need for a chemical conversion treatment that does not entail the use of chromium and methods have been developed that make use of the above-mentioned manganese or other metal salts. A method in which a manganese phosphate compound is used has recently come to be used often as a substitute for a chromate treatment. However, experiments conducted by the inventors have revealed that the use of manganese phosphate is not the chemical conversion treatment that is best suited to injection joining.

The following (1) to (3) are essential requirements of the alloy needed for injection joining according to the hypothesis of the inventors.

(1) There must be roughness on the µm (micrometer) order on the surface obtained by chemical conversion treatment and furthermore the concave surfaces must have microroughness with height difference of at least 10 nm (nanometers). In particular, this microroughness will be preferable with highest injection joining strength if there is height difference of 50 nm at a period of 50 to 100 nm, if there are recesses or protrusions with a diameter of 50 nm and a height or depth of the same order at a period of 50 to 100 nm or if there are partitions or grooves with a height or depth of 50 nm and a width of 50 nm at a period of 50 to 100 nm.

(2) The surface layer must be a ceramic layer of high hardness, composed of an oxide, carbonate, hydroxide and/or phosphorus oxide of a metal, including magnesium, instead of being a natural oxidation layer of a magnesium alloy.

(3) The hard ceramic layer and the magnesium alloy serving as the base must be joined together securely.

It is impossible to adequately satisfy the above requirements (1), (2) and (3) with the currently used chemical conversion treatments of magnesium alloy including pretreatment. The inventors experimented by trial and error on pretreatment methods, chemical conversion treatment methods, combined methods, etc., which could be used for injection joining, and as a result developed a treatment method that satisfies the above requirements (1), (2) and (3) with a suitable pretreatment method, a chemical conversion treatment method that makes use of potassium permanganate as well as a treatment method by adding a step between the pretreatment and the chemical conversion treatment.

With a chemical conversion treatment method in which potassium permanganate is used as the treatment solution, the fact that the joint strength between the chemical conversion film and the base is stronger than that of a chemical conversion film produced with other chemicals was the first reason for concluding that this method is suited to injection joining. It was later found that, even with a chemical conversion film produced with this potassium permanganate solution, there is a sharp drop-off in injection joining strength with the resin if the film is too thick. When an integrated product obtained by joining a PPS resin composition by injection joining with a magnesium alloy covered with this thick chemical conversion film was broken in a tensile break test and the two fracture surfaces were examined, substantially the same chemical conversion films were found to be present on both the metal side and the resin composition side.

When the fracture surface of an integrated product obtained from a thin chemical conversion film that exhibited high breaking strength was observed, most of the chemical conversion film was adhering to the resin composition side, so the situation was clearly different. Specifically, this chemical conversion film is hard but brittle and, if it is thick, it is so strong that the chemical conversion film itself breaks before the joint with the resin does. Consequently, a thinner chemical conversion film is preferable for injection joining, whereas a film that is thick and not so hard (with toughness) is preferable for corrosion resistance, so it was found that there is no simple method that would satisfy both of these.

The meaning of obtaining roughness on the µm order by chemical etching will now be described in relation to injection joining. When a metal is immersed in an aqueous solution of an acid or base capable of corroding that metal, the surface is etched and takes a certain amount of texturing. This texturing is unlike texturing obtained by mechanical means, such as polishing with sandpaper, in that most of the recesses that are obtained have an undercut structure. An undercut structure means that there are places that cannot be seen inside the recesses when the recesses are viewed from above and, if we could look at these microscopically from the bottom of the recess, overhang portions would be seen. Because it is the result of a chemical reaction, the corrosion of the metal proceeds in all directions, not just vertically, so the recesses often have an undercut structure. This is important because it is related to the anchoring with the resin portion.

In order to obtain high joint strength the chemical conversion film is preferably not too thick, while in order to obtain high corrosion resistance the chemical conversion film is preferably as thick as possible, as discussed above. Because of this, the chemical conversion treatment method that is preferable for injection joining will not necessarily be favorable when it comes to corrosion resistance. In view of this, the inventors developed a method for treating the surface of a metal alloy part in an effort to form a surface that has excellent corrosion resistance while also achieving good joint strength in injection joining. Furthermore, the inventors obtained an integrated resin/metal product by injection joining of a resin with a metal alloy part that had undergone this surface treatment and put this product directly into a conventional type of chemical conversion treatment solution.

It was necessary to confirm experimentally whether or not it made sense to put something, which already had a certain amount of chemical conversion film and had first gone through a separate step, back into the same or into a different chemical conversion treatment solution, while the result was that it did make sense. It is unclear whether corrosion resistance was improved because of another film over the chemical conversion film obtained in the previous step through the additional chemical conversion treatment or because of filling of cracks or pinholes in the chemical conversion film obtained in the previous step through the additional chemical conversion treatment. The inventors made decision from the result of an evaluation test in which scratches were made in a paint film, a salt water spray test was conducted and it was examined how much the paint film swelled or how much rust there was at the location of the scratch.

The specific ways to carry out the steps will now be described.

[Surface Treatment/Pretreatment of Magnesium Alloy Part]

A magnesium alloy part is preferably first immersed in a degreasing tank to remove any oil or fingerprints that adhered during machining. More specifically, a commercially available magnesium degreaser is poured into warm water in the concentration specified by the manufacturer and the magnesium alloy part is preferably immersed and washed in the aqueous solution. With an ordinary commercially available product, the concentration is between 5 and 10%, the solution temperature is between 50 and 80° C. and the part is soaked for 5 to 10 minutes. The part is then etched by being immersed in an acidic aqueous solution, the surface layer of the magnesium alloy part is dissolved and any soil, remaining oil or surfactant is also removed. The solution for use can be a weakly acidic aqueous solution with a pH of from 2 to 5 of an organic carboxylic acid such as acetic acid, propionic acid, citric acid, malonic acid, benzoic acid or phthalic acid or of an inorganic acid such as nitric acid, hydrochloric acid, phosphoric acid or hydrofluoric acid.

The use of acetic acid, propionic acid, citric acid, malonic acid or another such aliphatic carboxylic acid is particularly favorable. The alloy may include heterogeneous metals in cases other than high-purity magnesium with a purity of close to 100%. For instance, with AZ31 and AZ91, aluminum is contained in an amount of 3 to 9% and zinc about 1%. Since the aluminum or zinc is not readily dissolved in the etching step, in which this weakly acidic aqueous solution is used but instead settles on the surface as an insoluble, a step is needed to dissolve away this settled material. This is known as smut removal. With AZ31 and AZ91, a favorable method is such that the part is first immersed in a weakly basic aqueous solution to dissolve the aluminum smut (first smut treatment) and then immersed in a strongly basic aqueous solution to dissolve away the zinc smut (second smut treatment).

At present, with the magnesium alloy chemical conversion treatments that are ordinarily used in industry, a commercially available aluminum alloy degreasing aqueous solution is used for most of the first smut treatments performed in pretreatment. This is because they are weakly basic and are themselves able to dissolve the very fine aluminum. With the present invention, however, it is preferable that the surface of a magnesium alloy piece is finally covered with texturing having a period of 100 to 10,000 nm or with recesses having a diameter of 100 to 10,000 nm and that superfine texturing with a height difference of at least 10 nm is formed on this surface. The above-mentioned etching step plays an important role in achieving this shape but it was found to a surprise that the first smut treatment step is an even more important step.

It seems likely that not only was the aluminum smut being removed but the aluminum exposed on the alloy surface was also dissolved so that an effect was given on the desired roughness. An aluminum alloy degreaser is what is usually used in the first smut removal step in an ordinary magnesium alloy chemical conversion treatment, while the inventors tried out many other weakly basic aqueous solutions. As a result, it was found that many different kinds can be used. Those with particularly good results are given in the working examples. In the second smut treatment, a caustic soda aqueous solution with a concentration of 15 to 25% was used, the temperature was set between 60 and 80° C. and the immersion time was between 5 and 10 minutes.

[Surface Treatment/Main Treatment of Magnesium Alloy Part]

The treatment that can be called the main treatment in the liquid treatment is then performed. The main treatment is preferably a two-stage immersion treatment, in which the part is immersed for a very short time in a weakly acidic aqueous solution to perform fine etching, and then chemical conversion treatment is performed. A weakly acidic aqueous solution of an organic carboxylic acid such as acetic acid, propionic acid, citric acid, benzoic acid, phthalic acid, phenol or a phenol derivative, with a pH of 4 to 6, can be used for a fine etching step and the immersion time is preferably very short, no more than 15 to 90 seconds. This fine etching step is not included in ordinary magnesium alloy chemical conversion treatment but the inventors found from experimental results that including a fine etching step results in better injection joining strength.

Nearly all of the non-chromate type chemical conversion treatments known in the past were tried and it was found that a potassium permanganate chemical conversion treatment is superior. This potassium permanganate chemical conversion treatment will be discussed in specific terms below. After finishing the pretreatment, the magnesium alloy part is finely etched by being immersed for 15 to 60 seconds in a citric acid hydrate aqueous solution with a concentration of 0.1 to 0.3% at a temperature of about 40° C., after which it is washed with deionized water.

Then, it is preferable that an aqueous solution containing potassium permanganate by 1.5 to 3.0%, acetic acid by 0.7 to 1.5% and sodium acetate hydrate by 0.3 to 1.0% and adjusted to a temperature of 40 to 50° C. is prepared as a chemical conversion treatment solution, the above-mentioned magnesium alloy part is immersed in this for 0.5 to 1 minute and then washed with water. This chemical conversion treatment method represents an improvement to the technology disclosed in the above-mentioned Japanese Patent Application Laid-open No. 2001-123274, the improvement being achieved by trial and error for the purpose of increasing injection joining strength. This product is put in a forced hot air dryer with a temperature of 80 to 90° C. and dried for 5 to 20 minutes. This treatment forms a thin layer whose main component is manganese oxide on the surface of the magnesium alloy part.

Thus, a magnesium alloy part is subjected to a first smut treatment and a second smut treatment as pretreatment, after which it is immersed for a very short time in a weakly acidic aqueous solution and finely etched and then subjected to a potassium permanganate chemical conversion treatment as a chemical conversion treatment. As a result, the requirements (1) to (3) needed for injection joining are satisfied, good injection joining strength is obtained and the product has a surface that also has excellent corrosion resistance.

[Resin Composition/PPS Composition]

The resin composition for constituting the present invention is composed of a resin composition containing PPS by 70 to 97 wt % and polyolefin resin by 3 to 30 wt %, while it is particularly favorable for it to be a resin composition containing PPS by 80 to 95 wt % and polyolefin resin by 5 to 20 wt %. If the PPS content here is less than 70 wt % or is over 97 wt %, then the resulting composite will not have good joining between the metal part and the resin composition part.

Any PPS can be used as long as it is classified as PPS while one with a melt viscosity of 100 to 30,000 poise (P) as measured at a temperature of 315° C. and a load of 98 N (10 kgf) with a Koka-type flow tester mounted with a die of 1 mm in diameter and 2 mm long is preferable because it will have better moldability and workability when formed into a resin composition part. Also, the PPS may be one substituted with amino groups, carboxyl groups or the like or may be one copolymerized with trichlorobenzene or the like during polymerization.

Also, the PPS may have a linear structure or may have a branched structure introduced, and may have undergone heat treatment in an inert gas, etc. Furthermore, the ions, oligomers or other such impurities in the PPS may have been reduced by performing a deionization treatment (acid washing, hot water washing, etc.) before or after heating and curing or its curing may have been promoted by performing a heat treatment in an oxidative gas upon completion of the polymerization reaction.

The polyolefin resin is an ethylene resin, propylene resin or other such material normally known as a polyolefin resin and may be a commercially available product. Of these, maleic anhydride-modified ethylene copolymers, glycidyl methacrylate-modified ethylene copolymers, glycidyl ether-modified ethylene copolymers, ethylene alkyl acrylate copolymers or the like are preferable because a composite with particularly good bondability can be obtained.

Examples of maleic anhydride-modified ethylene copolymers include maleic anhydride graft-modified ethylene copolymers, maleic anhydride-ethylene copolymers and ethylene-acrylic acid ester-maleic anhydride ternary copolymers, of which an ethylene-acrylic acid ester-maleic anhydride ternary copolymer is preferable because a particularly excellent composite is obtained. A specific example of an ethylene-acrylic acid ester-maleic anhydride ternary copolymer is Bondine (made by Arkema).

Examples of glycidyl methacrylate-modified ethylene copolymers include glycidyl methacrylate graft-modified ethylene copolymers and glycidyl methacrylate-ethylene copolymers, of which a glycidyl methacrylate-ethylene copolymer is preferable because a particularly excellent composite is obtained. A specific example of a glycidyl methacrylate-ethylene copolymer is Bondfast (made by Sumitomo Chemical).

Examples of glycidyl ether-modified ethylene copolymers include glycidyl ether graft-modified ethylene copolymers and glycidyl ether-ethylene copolymers and a specific example of an ethylene alkyl acrylate copolymer is Lotryl (made by Arkema).

With the composite of the present invention, the resin composition part preferably contains polyfunctional isocyanate compound by 0.1 to 6 weight parts and/or epoxy resin by 1 to 25 weight parts additionally per 100 weight parts of the total resin component including PPS by 70 to 97 wt % and polyolefin resin by 3 to 30 wt %, because the joining of the magnesium part or magnesium alloy part and the resin composition part will be better.

A commercially available non-blocked or blocked polyfunctional isocyanate compound can be used as a polyfunctional isocyanate compound. Examples of polyfunctional non-blocked isocyanate compounds include 4,4'-diphenylmethane diisocyanate, 4,4'-diphenylpropane diisocyanate, toluene diisocyanate, phenylene diisocyanate, and bis(4-isocyanate phenyl)sulfone. A polyfunctional blocked isocyanate compound has two or more isocyanate groups per molecule, these isocyanate groups react with a volatile active hydrogen compound and is inert at normal temperature. There are no particular restrictions on the type of polyfunctional blocked isocyanate compound but generally it will have a structure in which the isocyanate groups are masked by a blocking agent such as an alcohol, a phenol, $\epsilon$-caprolactam, an oxime, or an active methylene compound. An example of a polyfunctional blocked isocyanate is Takenate (made by Mitsui Takeda Chemical).

The epoxy resin can be any commonly known type such as a bisphenol A type or a cresol novolac type. An example of a bisphenol A type is Epikote (made by Japan Epoxy Resin), while an example of a cresol novolac type is Epiclon (made by Dainippon Ink & Chemicals).

Also, for the purpose of increasing the mechanical strength of the resin composition part and adjusting the difference in the linear coefficient of expansion between the resin composition part and the magnesium part or magnesium alloy part, it is preferable that the resin composition of the composite of the present invention further contains filler by 1 to 200 weight parts, even more preferably by 10 to 150 weight parts additionally per 100 weight parts of the total resin component including PPS by 70 to 97 wt % and polyolefin resin by 3 to 30 wt %.

Examples of fillers include fibrous fillers, granular fillers, flaked fillers and so forth. Examples of fibrous fillers include glass fiber, carbon fiber and aramid fiber; an example of glass fiber is chopped strands with an average fiber diameter of 6 to 14 μm. Examples of flaked and granular fillers include calcium carbonate, mica, glass flakes, glass balloons, magnesium carbonate, silica, talc, clay and pulverized carbon fiber or aramid fiber. The filler has preferably been treated with a silane coupling agent or a titanate coupling agent.

[Resin Composition/PBT Composition]

The PBT resin composition will now be discussed. The resin component is preferably made up of PET and/or polyolefin resin by 3 to 30% and PBT by 70 to 97%. The same polyolefin resins as those listed for the PPS resin composition can be used. If the PET and/or polyolefin resin accounts for too small a proportion of the composition or is more than 30% of the resin composition, then a reliable effect will not be given on injection joining strength.

Referring to injection joining, it is preferable for the PET and/or polyolefin resin to account for 5 to 20% because joint strength will be particularly good and stable. Additionally to say, if the PET component accounts for more than 30% of the resin composition, an ester interchange reaction may occur at the high temperature encountered in the injection barrel of an injection molding machine, which would decrease the strength of the resin itself. Further, if the polyolefin component accounts for more than 30% of the resin composition, gas may be generated during injection molding and the runner or the like may be difficult to remove, which could interfere with the molding cycle. Admixing a large amount of filler to bring the coefficient of thermal expansion in line with that of magnesium or a magnesium alloy makes the injection joining strength more stable over time. The same applies to the above-mentioned PPS composition.

[Resin Composition/Aromatic Polyamide Composition]

The aromatic polyamide resin composition will now be described. It is preferable that at least 80% of the resin composition is phthalic acid-based nylon and furthermore both nylon 6I (a polyamide obtained from hexamethylenediamine and isophthalic acid) and nylon 6T (a polyamide obtained from hexamethylenediamine and terephthalic acid) are contained.

An aromatic nylon absorbs less moisture than an aliphatic nylon and in this sense is suited to preserving long-term joining with a metal, while on the other hand it has been discovered that, if it is mixed with a similar nylon as discussed above, the properties during quenching will be greatly different from those of ordinary thermoplastic resins. Specifically, when an article by injection molding is obtained under specific injection molding conditions from thermoplastic resin with various kinds of crystallinity, most of the resin in the obtained article will already be crystallized, solidified and will have more or less reached its final stable state, while an aromatic nylon, particularly an aromatic nylon mixed with a similar polymer, is rather strange in that its plasticity remains for a few dozen seconds immediately after parting.

Although not well known in Japan and produced mainly in the United States, this is called "forcibly removable nylon" in the US. The literature was searched for an analysis into its polymer chemistry but unfortunately the inventors could find no document in which this was clarified. As discussed above, however, the inventors believed that a crystalline resin that crystallized slowly during quenching would be a resin suited to injection joining and have been modifying PBT or PPS in line with this approach. From this viewpoint, it was concluded that a "forcibly removable nylon" is clearly a crystalline resin that crystallizes and solidifies slowly during quenching. Aromatic nylons, actually synthesized and mixed, were used as injection joining resins with magnesium alloys, which yielded the following findings.

Specifically, the crystallization and solidification rate during quenching is indeed much slower than that of the above-mentioned modified PBT or PPS resins and in fact is so slow that how the resin is handled during injection joining has also to be changed. There were cases when the resin molding and the inserted magnesium alloy piece separated and parted upon impact at parting within the time of mold cooling taken in normal injection molding, such as 15 to 25 seconds. Consequently, it is needed first to conduct an injection joining test in which the cooling time is increased sharply (such as 60 to 90 seconds) and to confirm that injection joining has really occurred. Furthermore, even if the cooling time is extended to such length, the crystallization is still in progress and the joint strength is not high enough yet, so that, if the mold is opened and the product is parted with an ejector pin and a powerful separation stress is exerted on the joint face, the joint strength ends up being weakened. To obtain sufficiently high joint strength with injection joining, some kind of modification is needed in both product design and mold design.

[Method for Manufacturing a Composite]

The method of the present invention for manufacturing a highly corrosion resistant composite is an injection molding method, in which a magnesium part or magnesium alloy part is inserted into a metallic mold for injection molding and this injection molding method is performed as follows. A mold for injection molding is made ready, this mold is opened and a magnesium part or magnesium alloy part that has undergone the above-mentioned liquid treatment is inserted into one half, the mold is closed, the above-mentioned thermoplastic resin composition is injected and solidified, then the mold is opened and the molding is parted, thus a composite being produced.

Next, the injection conditions will be described. The temperature of the metallic mold has little effect on resin strength, especially after solidification and a temperature of at least 100° C. is preferable, with a temperature of at least 120° C. being even better, because the composite production efficiency will be higher. Meanwhile, the injection temperature, injection pressure and injection rate are the same as in ordinary injection molding but, if it is to be said, the injection rate and injection pressure are preferably on the high side. The resulting composite is not to be touched by hand as far as possible and it is particularly important not to touch the magnesium or magnesium alloy part by hand. In injection joining, spraying a parting agent or the like on the mold is strictly forbidden and it is important that the mold be wiped completely clean of any adhering oils such as volatile oils prior to insertion. A composite obtained in this manner will not be soiled and, if care is taken in the annealing processing, a clean, integrated composite will be obtained.

[Composite Chemical Conversion Treatment Method]

The composite obtained in the above process, in which a resin composition is integrated with a magnesium part or magnesium alloy part, is subjected to a chemical conversion treatment by being immersed in a commercially available chemical conversion treatment solution for magnesium alloy. The integrated composite had already undergone a chemical conversion treatment for potassium permanganate developed by the inventors for use in injection joining, so the surface was covered with a thin layer whose main component was manganese dioxide, while an experiment was conducted to check whether a further chemical conversion treatment would be effective on that surface. The reason is that according to ordinary knowledge of chemistry, even if manganese dioxide is immersed in a manganese phosphate aqueous solution, the expected result is that there will be no particular reaction. Nevertheless, the results of the experiment showed that the second layer of chemical conversion treatment actually did have a clear effect in a corrosion resistance test.

Particularly good corrosion resistance was noted with the product for which treatment was performed with a manganese phosphate chemical conversion treatment solution containing calcium ions and the product for which treatment was performed with a commercially available silicon-based chemical conversion treatment solution. It is still not clear whether these reacted with the manganese dioxide layer and built up over the manganese dioxide layer, thereby increasing corrosion resistance by making the chemical conversion film thicker or there were numerous thin gaps and pinholes in the manganese dioxide layer, through which some ions can pass, and these were filled in by the new chemical conversion treatment. In any case, commercially available chemical conversion treatment solutions for magnesium alloy and the chemical conversion treatment solutions selected from the working examples and produced by the inventors were all found to have an improvement effect.

The technique disclosed in Japanese Patent Application Laid-open No. H11-131255 was employed as an example of a chemical conversion treatment solution for manganese phosphate containing calcium ions. This document discloses an aqueous solution in which calcium nitrate, manganese carbonate, phosphoric acid and a small amount of sodium chlorate were dissolved (actually a suspension in which not all of the manganese carbonate could dissolve). Also, ordinary manganese phosphate-based or silicon-based chemical conversion treatment solutions for magnesium alloy are commercially available from many companies. In this embodiment, a commercially available product from Meltex (Saitama-city, Saitama, Japan) was used. There are also many other techniques for chemical conversion treatment that have been disclosed in patent documents and so forth and some of these were implemented. The conclusions by the inventors are given in the working examples of the present invention, where a silicon-based chemical conversion treatment or chemical conversion treatment with manganese phosphate containing calcium were superior to other treatments.

[Painting of the Composite]

The composite obtained in the above process, in which a resin composition is integrated with a magnesium part or magnesium alloy part, can be used as it is, while it may be painted for use as an exterior part. A bake-on paint for coating metals can be used favorably as a paint with which both the resin composition and the magnesium part or magnesium alloy part can be painted. A paint that is baked on at a high-temperature can be used without problem on the resin composition side as well, since the resin composition is heat resistant up to a temperature of about 200° C. without any problem.

If the magnesium part or magnesium alloy part alone is to be painted, then a commercially available paint for coating magnesium alloys can be used. Urethane paints and acrylic urethane paints are some of the paints that are sold for use on magnesium alloys and, since these have a low baking temperature of 120° C. or lower, the forced hot air dryers dealt with by many painting companies can be used. However, when these are used to paint a PBT resin composition or a PPS resin composition, they may not have adequate adhesion to the resin composition.

Applying the present invention, that is, increasing joinability and efficiency and expanding the scope of application, contributes to reducing the weight of mobile electronic equipments or consumer electrical equipments, reducing the weight of on-board equipments and parts, reducing the weight of robotic arms and legs as well as to supplying, weight reduction and productivity of parts and casings in many other fields.

As explained in details above, a highly corrosion resistant composite manufactured by the manufacturing method of the present invention is such that a magnesium part or magnesium alloy part is integrated with a resin composition so that they will not readily come apart and also has excellent corrosion resistance. Also, a highly corrosion resistant composite with superior corrosion resistance can be easily and reliably manufactured by subjecting a magnesium part or magnesium alloy part to a specific chemical conversion treatment, then joining this by injection joining with a thermoplastic resin composition having a resin component whose main component is PPS, a resin component whose main component is PBT or a resin component that is an aromatic polyamide resin containing both nylon 6I and nylon 6T and then performing an ordinary chemical conversion treatment.

DETAILED DESCRIPTION OF THE EMBODIMENTS

Figure 1:
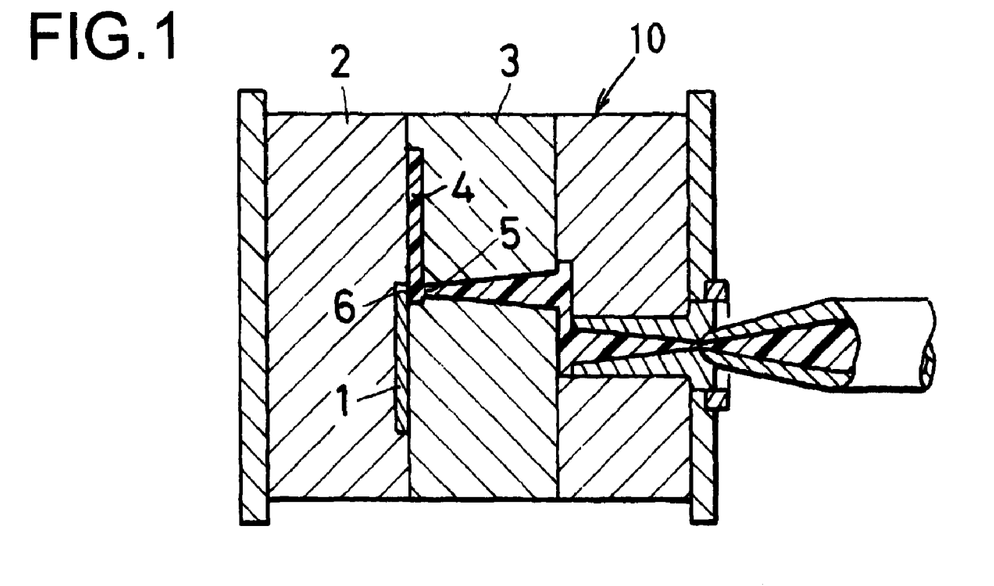
FIG. 1 is a cross-sectional view of a mold structure schematically illustrating the process of manufacturing a composite in which a magnesium part or a magnesium alloy part is integrated with a resin composition.
Figure 2:
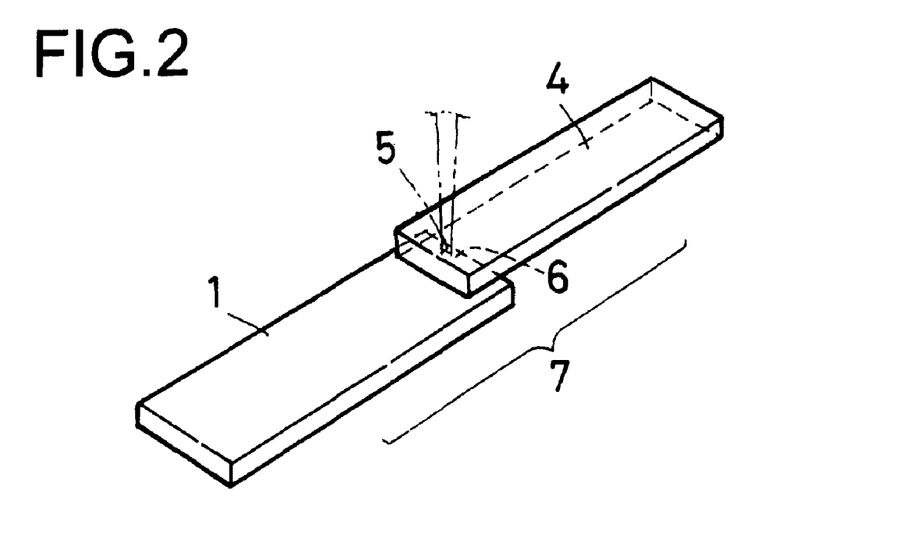
FIG. 2 is an oblique view schematically illustrating a composite in which a magnesium part or a magnesium alloy part is integrated with a resin composition.

Embodiments of the present invention will now be described through working examples. FIG. 1 is a structural view schematically illustrating a cross section of a metallic mold for injection molding. This mold for injection molding 10 is used to mold a composite 7 by inserting into a mold 2 a magnesium part or magnesium alloy part 1 that has been worked into a specific shape and injecting a resin composition 4 into this through a pin gate 5. Fine recesses had been formed on the surface of the magnesium part or magnesium alloy part 1. The fine recesses form a joint face 6 and the resin composition 4 is joined at this joint face 6. FIG. 2 is an oblique view of the composite 7 after joining. That is, the composite 7 shown in FIG. 2 is such that the magnesium part or magnesium alloy part 1 and the resin composition 4 have been integrated at the joint face 6. What is shown in FIGS. 1 and 2 is common to all of the working examples that will be given below. In the working examples described below, the joint strength of the various products manufactured according to the present invention is indicated by the measured shear fracture strength, and confirms the efficacy of the present invention.

WORKING EXAMPLES

Working examples of the present invention will now be discussed in detail. First, the methods used to perform evaluation and measurement for the composites obtained in the examples will be given.

[Measurement of PPS Melt Viscosity]

The melt viscosity was measured at a measurement temperature of 315° C. and a load of 98 N (10 kgf) with a Koka-type flow tester mounted with a die 1 mm in diameter and 2 mm long (CFT-500 made by Shimadzu Seisakusho).

[Surface Examination]

(a) X-ray Diffraction Analyzer

The surface was examined with an X-ray diffraction analyzer (XRD) that irradiates a sample with X rays and performs analysis at the crystal level from the resulting data by diffraction lattice. The X-ray diffraction analyzer used here was an XRD-6100 (trade name; made by Shimadzu Seisakusho, Kyoto, Japan) capable of examining surfaces only a few microns in diameter within a depth range of a few nanometers.

(b) Electron Microscope Examination

An electron microscope was used mainly to examine the surface of the parts. The electron microscopes used here were S-4800 (trade name; made by Hitachi, Tokyo, Japan) and JSM-6700F (trade name; made by JEOL, Tokyo, Japan) scanning electron microscopes (SEM) and the examinations were made at 1 to 2 kV.

(c) Scanning Probe Microscope Examination

A scanning probe microscope was used to examine the roughness (texturing) of the surface. The scanning probe microscope used here was an SPM-9600 (trade name; made by Shimadzu Seisakusho, Kyoto, Japan).

[Joint Strength Measurement of Composite]

In the joint strength test a tensile tester (Model 1323 (trade name); made by Aiko Engineering, Tokyo, Japan) was used and the shear fracture strength was measured at a tensile rate of 10 mm/minute.

[Corrosion Resistance Test of Composite (Salt Water Spray Test)]

A salt water spray tester (SPT-90 (trade name); made by Suga Test Instruments, Tokyo, Japan) was used for the corrosion resistance test, in which salt water with a concentration of 5% was sprayed continuously for 24 hours at a temperature of 35° C., then the test piece was washed with deionized water, dried with forced air, etc. and its corrosion resistance was evaluated.

Preparation Example 1

PPS Composition 6,214 g of $Na_2S \cdot 2.9H_2O$ and 17,000 g of N-methyl-2-pyrrolidone were supplied to a 50 L autoclave equipped with a stirrer. The temperature was gradually raised to 205° C. while the contents were stirred under a nitrogen gas flow, and 1,355 g of water was distilled off. The system was cooled to 140° C., after which 7,160 g of p-dichlorobenzene and 5,000 g of N-methyl-2-pyrrolidone were added and the system, that is, the autoclave was sealed under a nitrogen gas flow. The temperature of the system was raised to 225° C. over a period of 2 hours and polymerized for 2 hours at a temperature of 225° C., after which the temperature was raised to 250° C. over a period of 30 minutes and polymerization was conducted for 3 hours at a temperature of 250° C. Upon completion of the polymerization, the system was cooled to room temperature and the polymer was isolated with a centrifuge. The solids were repeatedly washed with warm water and then dried overnight at a temperature of 100° C., which gave a PPS with a melt viscosity of 280 poise (P) (hereinafter referred to as PPS (1)).

This PPS (1) was cured for 3 hours at a temperature of 250° C. under a nitrogen atmosphere, which gave a PPS (hereinafter referred to as PPS (2)). The melt viscosity of the PPS (2) thus obtained was 400 poise (P). 6.0 kg of the obtained PPS (2), 1.5 kg of an ethylene-acrylic acid ester-maleic anhydride ternary copolymer (Bondine TX8030; made by Arkema) and 0.5 kg of Epikote 1004 (made by Japan Epoxy Resin) were uniformly mixed preliminarily in a tumbler. After this, the material was melt-kneaded at a cylinder temperature of 300° C. in a biaxial extruder (TEM-35B; made by Toshiba Machine) while glass fiber with an average fiber diameter of 9 µm and a fiber length of 3 mm (RES03-TP91; made by Nippon Sheet Glass) was supplied from a side feeder so that the added amount would be 20 wt %, which gave a pelletized PPS composition (1). The PPS composition (1) thus obtained was dried for 5 hours at a temperature of 175° C.

Preparation Example 2

PPS Composition

The PPS (1) obtained in Preparation Example 1 was cured for 3 hours at a temperature of 250° C. under an oxygen atmosphere, which gave a PPS (hereinafter referred to as PPS (3)). The melt viscosity of the PPS (3) thus obtained was 1,800 poise (P). 5.98 kg of the obtained PPS (3) and 0.02 kg of polyethylene (Nipolon Hard 8300A; made by Tosoh) were uniformly mixed preliminarily in a tumbler. After this, the material was melt-kneaded at a cylinder temperature of 300° C. in a biaxial extruder (TEM-35B) while glass fiber with an average fiber diameter of 9 µm and a fiber length of 3 mm (RES03-TP91) was supplied from a side feeder so that the added amount would be 40 wt %, which gave a pelletized PPS composition (2). The PPS composition (2) thus obtained was dried for 5 hours at a temperature of 175° C.

Preparation Example 3

PPS Composition 7.2 kg of the PPS (2) obtained in Preparation Example 2 and 0.8 kg of a glycidyl methacrylate-ethylene copolymer (Bondfast E; made by Sumitomo Chemical) were uniformly mixed preliminarily in a tumbler. After this, the material was melt-kneaded at a cylinder temperature of 300° C. in a biaxial extruder (TEM-35B) while glass fiber with an average fiber diameter of 9 µm and a fiber length of 3 mm (RES03-TP91) was supplied from a side feeder so that the added amount would be 20 wt %, which gave a pelletized PPS composition (3). The PPS composition (3) thus obtained was dried for 3 hours at a temperature of 175° C.

Preparation Example 4

PPS Composition 4.0 kg of the PPS (2) obtained in Preparation Example 2 and 4.0 kg of an ethylene-acrylic acid ester-maleic anhydride ternary copolymer (Bondine TX8030; made by Arkema) were uniformly mixed preliminarily of time in a tumbler. After this, the material was melt-kneaded at a cylinder temperature of 300° C. in a biaxial extruder (TEM-35B) while glass fiber with an average fiber diameter of 9 µm and a fiber length of 3mm (RES03-TP91) was supplied from a side feeder so that the added amount would be 20 wt %, which gave a pelletized PPS composition (4). The PPS composition (4) thus obtained was dried for 3 hours at a temperature of 175° C.

Preparation Example 5

PBT Composition 4.5 kg of PBT resin (Toraycon 1100S; made by Toray) and 0.5 kg of PET resin (TR-4550BH; made by Teijin) were uniformly mixed in a tumbler. After this, the material was melt-kneaded at a cylinder temperature of 270° C. in a biaxial extruder (TEM-35B) while glass fiber with an average fiber diameter of 9 µm and a fiber length of 3mm (RES03-TP91) was supplied from a side feeder so that the added amount would be 30 wt %, which gave a pelletized PBT composition.

This was dried for 3 hours at a temperature of 140° C. to obtain a PBT composition (1).

Preparation Example 6

PBT Composition 6.0 kg of PBT resin (Toraycon 1401X31; made by Toray), 0.7 kg of an ethylene-acrylic acid ester-maleic anhydride ternary copolymer (Bondine TX8030; made by Arkema) and 0.15 kg of an epoxy resin (Epikote 1004; made by Japan Epoxy Resin) were uniformly mixed preliminarily of time in a tumbler. After this, the material was melt-kneaded at a cylinder temperature of 270° C. in a biaxial extruder (TEM-35B; made by Toshiba Machine) while glass fiber with an average fiber diameter of 9 μm and a fiber length of 3mm (RES03-TP91; made by Nippon Sheet Glass) was supplied from a side feeder so that the added amount would be 30 wt %, which gave a pelletized PBT composition (2). The PBT composition (2) thus obtained was dried for 3 hours at a temperature of 150°C.

Preparation Example 7

PBT Composition 6.0 kg of PBT resin (Toraycon 1401X31; made by Toray), 0.5 kg of PET resin (TR-4550BH; made by Teijin), 0.5 kg of an ethylene-acrylic acid ester-maleic anhydride ternary copolymer (Bondine TX8030; made by Arkema) and 0.1 kg of an epoxy resin (Epikote 1004; made by Japan Epoxy Resin) were uniformly mixed preliminarily in a tumbler. After this, the material was melt-kneaded at a cylinder temperature of 270° C. in a biaxial extruder (TEM-35B; made by Toshiba Machine) while glass fiber with an average fiber diameter of 9 μm and a fiber length of 3 mm (RES03-TP91; made by Nippon Sheet Glass) was supplied from a side feeder so that the added amount would be 30 wt %, which gave a pelletized PBT composition (3). The PBT composition (3) thus obtained was dried for 3 hours at a temperature of 150° C.

Preparation Example 8

Aromatic Polyamide Resin Composition

Nylon 6I, which is a polyamide composed of hexamethylenediamine and isophthalic acid, was synthesized. Nylon 6T, which is a polyamide composed of hexamethylenediamine and terephthalic acid, was also synthesized. 0.5 kg of nylon 66, 1 kg of nylon 6I and 2.5 kg of nylon 6T were uniformly mixed in a tumbler. After this, the material was melt-kneaded at a cylinder temperature of 280° C. in a biaxial extruder (TEM-35B) while glass fiber with an average fiber diameter of 9 μm and a fiber length of 3mm (RES03-TP91) was supplied from a side feeder so that the added amount would be 50 wt % and this product was pelletized. The pellets were dried for 4 hours at a temperature of 80° C. to obtain an aromatic resin composition (1).

Working Example 1

An AZ31B magnesium alloy (made by Nippon Kinzoku) was purchased that had a thickness of 1.5 mm and an average metal crystal grain diameter of 7 μm and which had undergone a final treatment of wet buffing. This was cut into numerous rectangular pieces measuring 18×45 mm in size and 0.8 mm thick and these were used as magnesium alloy pieces (the magnesium alloy part 1). A hole was made in the ends of these magnesium alloy pieces, a copper wire coated with polyvinyl chloride was passed through a dozen or so pieces and the copper wire was bent so that the magnesium alloy pieces would not overlap each other, thus allowing all to be hung up at the same time.

Water was added to a commercially available degreaser for magnesium alloy (Cleaner 160; made by Meltex) in a tank to prepare an aqueous solution with a concentration of 10% and a temperature of 75° C. The magnesium alloy pieces were immersed for 5 minutes in this and then thoroughly rinsed with water. A 1% citric acid hydrate aqueous solution adjusted to a temperature of 40° C. was then made ready in a separate tank, then the magnesium alloy pieces were immersed for 4 minutes in this and thoroughly rinsed with water. Black smut adhered to the pieces. Then, an aqueous solution containing sodium carbonate by 1% and sodium hydrogencarbonate by 1% and adjusted to a temperature of 65° C. was made ready in another tank, then the above-mentioned magnesium alloy pieces were immersed for 5 minutes and thoroughly rinsed with water. A 15% caustic soda aqueous solution adjusted to a temperature of 65° C. was then made ready in another tank, then the magnesium alloy pieces were immersed for 5 minutes in this and thoroughly rinsed with water. Thus the zinc component out of the smut was dissolved.

Then, the pieces were immersed for one minute in a 0.25% citric acid hydrate aqueous solution at a temperature of 40° C. that had been made ready in another tank and thoroughly rinsed with water. An aqueous solution containing potassium permanganate by 2%, acetic acid by 1% and sodium acetate hydrate by 0.5% and adjusted to a temperature of 45° C. was made ready in another tank, the pieces were immersed in this for 1 minute, thoroughly rinsed with water, then put in a forced warm air dryer adjusted to a temperature of 90° C. for 10 minutes and dried. After drying, the copper wire was taken out of the magnesium alloy pieces placed on a clean aluminum foil and the pieces were wrapped up together, then put in a plastic bag, sealed and stored. In this work, no fingers touched the surfaces to be joined (the ends on the opposite side from where the holes were made).

Two days later, a single magnesium alloy piece was taken out and observed with an electron microscope. The piece had a complex surface covered with countless cylindrical protrusions about 20 nm in diameter and about 20 to 50 nm in length and this surface was made up of wide recesses measuring from a few hundred to a thousand nanometers in diameter and that were created by these protrusions. The roughness of another magnesium alloy piece was examined with a scanning probe microscope, which revealed the period of the bumps and pits to be 0.3 to 2 μm and the height difference (depth) to be 0.1 to 0.4 μm. Still another piece was analyzed by XPS, which turned up large peaks for oxygen and manganese and a small peak for carbon, as well as tiny peaks for magnesium, aluminum and zinc.

It was clear from the XPS that the surface was covered with manganese oxide, which was concluded to be manganese dioxide because it is well known that manganese dioxide of Mn(IV) is obtained through the reduction of an alkali metal salt of permanganic acid under weakly acidic conditions. Manganese dioxide is black and conductive, while the magnesium alloy turns a reddish-brown color after chemical conversion treatment, it would turn blackish-brown if the immersion time in the chemical conversion treatment were lengthened and the chemical conversion treated face was conductive. From these, there was no doubt that that the surface was covered with manganese dioxide. Still another piece was analyzed by XRD but the crystals of manganese oxide, which were expected, were not observed. That is, neither crystals of manganese dioxide nor any other identified manganese oxide crystals were observed. Therefore, either the manganese dioxide was in an amorphous state or the crystals were there nevertheless were too small to be observed by XRD.

One day later, the remaining magnesium alloy pieces were taken out. For each of them, the portion with the hole was grasped with a glove so that no oil or the like would adhere to and the piece was inserted into a metallic mold for injection molding adjusted to a temperature of 140° C. The mold was closed and the PPS composition (1) obtained in Preparation Example 1 was injected at an injection temperature of 310° C. to effect injection joining. The mold was parted and 20 of the integrated composites shown in FIG. 2 were obtained. The size of the resin part was 10 mm×45 mm×5 mm and the joining face 6 measured 10 mm×5 mm (0.5 cm$^2$). Four of these products were subjected to a tensile breakage test on the day of molding and the average shear fracture strength was found to be 25.0 MPa. Also, five composites were put in a forced hot air dryer with a temperature of 170° C. for 1 hour, annealed on the day of the molding and one day later were subjected to a tensile test, while the average shear fracture strength was found to be 24.2 MPa.

The remaining 10 integrated composites were annealed by being put in a forced hot air dryer with a temperature of 170° C. for 1 hour. The resin components of the integrated composites were then grabbed with clips and hung down. Meanwhile, an aqueous solution containing calcium nitrate hydrate by 1.77%, manganese carbonate by 0.08%, 80% phosphoric acid by 0.74% and sodium chlorate by 0.015% was allowed to stand for 1 hour while being stirred occasionally and kept at a temperature of 60° C. to dissolve as much of the insoluble portion (manganese carbonate) as possible. The integrated composites were immersed for 2 minutes in this aqueous suspension with a temperature of 60° C., then rinsed with water and dried for 15 minutes at a temperature of 90° C.

Two days later these integrated composites were painted with the coating thickness set to 10 μm (paint: Omac/Black; made by Ohashi Chemical), dried at a temperature of 100° C. for 1 hour, further painted with the coating thickness set to 10 μm (paint: Omac/Silver Metallic) and then baked for 30 minutes at a temperature of 170° C. Three days after having baked the coating, six scratches measuring 20 mm in length were made on each composite with a cutter knife at intervals of 2 mm in the paint film and then one more cut was made intersecting these six scratches. One week later the composites were placed in a salt water spray tester. Using salt water with a concentration of 5%, salt water spraying was conducted for 24 hours at a temperature of 35° C., then the composites were rinsed with deionized water, wiped with a paper napkin and dried in air. The paint film on the side where the scratches had been made with the cutter knife had not lifted up and there was no spreading of rust from the scratches. These composites were subjected to a tensile break test and the shear fracture strength was found to be 17.1 MPa.

Working Example 2

In exactly the same manner as in Working Example 1, AZ31B magnesium alloy pieces were pretreated, finely etched and subjected to chemical conversion treatment. Furthermore, in exactly the same manner as in Working Example 1, each piece was inserted into a metallic mold for injection molding, the PPS composition (1) was injected, the mold was parted, the integrated composite shown in FIG. 2 was obtained and annealed on the same day and ten of these composites were obtained. The resin components of the integrated composites were then grabbed with clips and hung down, a commercially available silicon-based chemical conversion treatment solution for magnesium alloy (Magtreat SI-5920; made by Meltex) was diluted according to the manufacturer's recommendation and the integrated composites were immersed for 1.5 minutes with the aqueous solution set to a temperature of 50° C., then rinsed with deionized water and dried for 15 minutes at a temperature of 90° C.

Three days later, the integrated composites were painted with the coating thickness set to 10 μm (paint: Omac/Black; made by Ohashi Chemical), dried for 1 hour at a temperature of 100° C. and further painted with Omac/Silver Metallic with the coating thickness set to 10 μm, after which these were baked for 30 minutes at a temperature of 170° C. Specifically, this is an example of using a commercially available silicon-based chemical conversion treatment agent for the chemical conversion treatment following integration. Four days after having baked the coating, scratches were made on the paint film of each composite with a cutter knife in exactly the same way as in Working Example 1 and the pieces were placed in a salt water spray tester. Using salt water with a concentration of 5%, salt water spraying was conducted for 24 hours at a temperature of 35° C., then the composites were rinsed with deionized water, wiped with a paper napkin and dried in air. The paint film on the side where the scratches had been made with the cutter knife had not lifted up and there was no spreading of rust from the scratches. These composites were subjected to a tensile break test and the shear fracture strength was found to be 20.5 MPa.

Working Example 3

In exactly the same manner as in Working Example 1, AZ31B magnesium alloy pieces were pretreated, finely etched and subjected to chemical conversion treatment. Furthermore, in exactly the same manner as in Working Example 1, each piece was inserted into an injection molding mold, the PPS composition (1) was injected, the mold was parted, the integrated composite shown in FIG. 2 was obtained and annealed on the same day and ten of these composites were obtained. The resin components of the integrated composites were then grabbed with clips and hung down, a commercially available manganese phosphate-based chemical conversion treatment solution for magnesium alloy (Magtreat MG-5901; made by Meltex) was diluted according to the manufacturer's recommendation and the integrated composites were immersed for 3 minutes with the aqueous solution set to a temperature of 50° C., then rinsed with deionized water and air dried.

Three days later, the integrated composites were painted with the coating thickness set to 10 μm (paint: Omac/Black; made by Ohashi Chemical), dried for 1 hour at a temperature of 100° C. and then painted with Omac/Silver Metallic with the coating thickness set to 10 μm, after which these were baked for 30 minutes at a temperature of 170° C. Specifically, this is an example of using a commercially available manganese phosphate-based chemical conversion treatment agent for the chemical conversion treatment following integration. Four days after having baked the coating, scratches were made in the paint film of each composite with a cutter knife in exactly the same way as in Working Example 1 and the pieces were placed in a salt water spray tester. Using salt water with a concentration of 5%, salt water spraying was conducted for 24 hours at a temperature of 35° C., then the composites were rinsed with deionized water, wiped with a paper napkin and dried in air. The paint film on the side where the scratches had been made with the cutter knife had not lifted up and there was no spreading of rust from the scratches. These composites were subjected to a tensile break test and the shear fracture strength was found to be 16.2 MPa.

Working Example 4

In exactly the same manner as in Working Example 1, an AZ31B magnesium alloy pieces pretreated, finely etched and subjected to chemical conversion treatment. Furthermore, in exactly the same manner as in Working Example 1, each piece was inserted into a metallic mold for injection molding, the PPS composition (1) was injected, the mold was parted, the integrated composite shown in FIG. 2 was obtained and annealed on the same day and ten of these composites were obtained. The resin components of the integrated composites were then grabbed with clips and hung down. Meanwhile, an aqueous solution containing calcium nitrate hydrate by 1.52%, manganese carbonate by 0.21%, 80% phosphoric acid by 1.8% and sodium chlorate by 0.04% was adjusted to a temperature of 70° C. and allowed to stand for 1 hour while being stirred occasionally, where insolubles (manganese carbonate) were still suspended. Nevertheless, the integrated composites were immersed for 3 minutes in this aqueous solution suspension at a temperature of 70° C. There was some foaming. The composites were rinsed with water and dried for 15 minutes at a temperature of 90° C.

Two days later, the integrated composites were painted with the coating thickness set to 10 μm (paint: Omac/Black; made by Ohashi Chemical), dried for 1 hour at a temperature of 100° C. and then painted with Omac/Silver Metallic with the coating thickness set to 10 μm, after which these were baked for 30 minutes at a temperature of 170° C. Three days after having baked the coating, scratches were made in the paint film of each composite with a cutter knife in exactly the same way as in Working Example 1 and the composites were placed in a salt water spray tester. Using salt water with a concentration of 5%, salt water spraying was conducted for 24 hours at a temperature of 35° C., then the composites were rinsed with deionized water, wiped with a paper napkin and dried in air. The paint film on the side where the scratches had been made with the cutter knife had not lifted up and there was no spreading of rust from the scratches. These composites were subjected to a tensile break test and the shear fracture strength was found to be 13.5 MPa, representing a considerable decrease. Because there was foaming in the second chemical conversion treatment, it was concluded that the second chemical conversion treatment broke up the original chemical conversion treatment layer and that this was linked to a decrease in joint strength.

Working Example 5

In exactly the same manner as in Working Example 1, an AZ31B magnesium alloy pieces were pretreated, finely etched and subjected to chemical conversion treatment. Furthermore, in exactly the same manner as in Working Example 1, each piece was inserted into a metallic mold for injection molding, the PPS composition (1) was injected, the mold was parted, the integrated composite shown in FIG. 2 was obtained and annealed on the same day and ten of these composites were obtained. The resin components of the integrated composites were then grabbed with clips and hung down. An aqueous solution containing calcium manganese biphosphate hydrate by 2.5%, 80% phosphoric acid by 2.0% and triethylamine by 2.0% was adjusted to a temperature of 45° C. and the pieces were immersed for 3 minutes, rinsed with deionized water for 15 seconds and dried for 15 minutes at a temperature of 90° C.

Three days later, these composites were painted with the coating thickness set to 10 μm (paint: Omac/Black; made by Ohashi Chemical), dried for 1 hour at a temperature of 100° C., and then painted with Omac/Silver Metallic with the coating thickness set to 10 μm, after which these were baked for 30 minutes at a temperature of 170° C. Four days after having baked the coating, scratches were made in the paint film of each composite with a cutter knife in exactly the same way as in Working Example 1 and the composites were placed in a salt water spray tester. Using salt water with a concentration of 5%, salt water spraying was conducted for 24 hours at a temperature of 35° C., then the composites were rinsed with deionized water, wiped with a paper napkin and dried in air. The paint film on the side where the scratches had been made with the cutter knife had not lifted up and there was no spreading of rust from the scratches. These composites were subjected to a tensile break test and the shear fracture strength was found to be 17.5 MPa.

Comparative Example 1

In exactly the same manner as in Working Example 1, an AZ31B magnesium alloy pieces were pretreated, finely etched and subjected to chemical conversion treatment. Furthermore, in exactly the same manner as in Working Example 1, each piece was inserted into a metallic mold for injection molding, the PPS composition (1) was injected, the mold was parted, the integrated composite shown in FIG. 2 was obtained and annealed on the same day and ten of these composites were obtained. These composites were painted with the coating thickness set to 10 μm (paint: Omac/Black; made by Ohashi Chemical), dried for 1 hour at a temperature of 100° C. and then painted with Omac/Silver Metallic with the coating thickness set to 10 μm, after which these were baked for 30 minutes at a temperature of 170° C. That is, this is an example in which a second chemical conversion treatment was not performed following integration.

Three days after baking the coating, scratches with a length of 20 mm were made in the paint film of each composites at intervals of 2 mm with a cutter knife and the composites were placed in a salt water spray tester. Using salt water with a concentration of 5%, salt water spraying was conducted for 24 hours at a temperature of 35° C., the composites were rinsed with deionized water and then these were dried for 15 minutes at a temperature of 70° C. The paint film on the side where the scratches had been made had lifted up and swelling of the paint film spread out 0.8 mm from the scratch lines. Rust itself had not spread from the scratch lines. These composites were subjected to a tensile break test, where the shear fracture strength was found to be 21.5 MPa and corrosion did not appear to have reached the joint face.

Comparative Example 2

Magnesium alloy pieces were produced, injection molding was performed and ten composites were obtained in exactly the same manner as in Working Example 1, except that the PPS composition (2) obtained in Preparation Example 2 was used instead of the PPS composition (1) obtained in Preparation Example 1. The obtained composites were annealed for 1 hour at a temperature of 170° C. In other words, this is an experiment in which a PPS resin composition composed of only a filler and a PPS containing a tiny amount of polyolefin polymer was used. One day later, these composites were subjected to a tensile test and the shear fracture strength was found to be 13 MPa on an average for the 10 composites. This was only about 50% of the numerical value in Working Example 1 and the difference in the resin material used was apparent in the results.

Working Example 6

Composites were obtained, annealed and subjected to chemical conversion treatment in exactly the same manner as in Working Example 2, except that the PPS composition (3) obtained in Preparation Example 3 was used instead of the PPS composition (1) obtained in Preparation Example 1. The painting was also conducted in exactly the same manner as in Working Example 1. In the same manner as in Working Example 2, scratches were made, salt water with a concentration of 5% was used to conduct a salt water spray test for 24 hours at a temperature of 35° C. and the composites were rinsed with water and dried, while the paint film on the side where the scratches had been made had not lifted up and there was no spreading of rust from the scratches. These composites were subjected to a tensile break test and the shear fracture strength was found to be 19.0 MPa.

Comparative Example 3

An attempt was made to manufacture a composite by the same method as in Working Example 1, except that the PPS composition (4) obtained in Preparation Example 4 was used instead of the PPS composition (1). In other words, this is an experiment in which a PPS resin composition containing a very large amount of polyolefin polymer was used. However, the molding had to be suspended due to a large amount of gas formation during molding.

Working Example 7

An AZ91D magnesium alloy sheet measuring 300 mm×150 mm in size and 3.5 mm thick, produced by die cast molding, was procured. One side of this was shaved with a planer to a thickness of 3mm and the sheet was cut into small pieces measuring 100 mm×25 mm, thereby obtaining numerous magnesium alloy pieces. A hole was then made in the end of each piece and the pieces were hung from a PVC-covered copper wire and these magnesium alloy pieces were subjected to the following liquid treatment.

Water was added to a commercially available magnesium alloy degreaser (Cleaner 160; made by Meltex) in a tank to prepare an aqueous solution with a concentration of 7.5% and a temperature of 75° C. The magnesium alloy pieces were immersed for 5 minutes in this and then thoroughly rinsed with water. A 1% malonic acid aqueous solution adjusted to a temperature of 40° C. was then made ready in another tank and the magnesium alloy pieces were immersed for 2.25 minutes in this and thoroughly rinsed with water. Black smut adhered to the pieces. Then, an aqueous solution containing sodium carbonate by 1% and sodium hydrogencarbonate by 1% and adjusted to a temperature of 65° C. was made ready in another tank and the above-mentioned magnesium alloy pieces were immersed for 5 minutes and thoroughly rinsed with water. A 15% caustic soda aqueous solution adjusted to a temperature of 65° C. was then made ready in another tank and the magnesium alloy pieces were immersed for 5 minutes in this and thoroughly rinsed with water. Then the pieces were immersed for 1 minute in a 40° C. aqueous solution containing citric acid hydrate by 0.25% to finely etch the pieces, which were then rinsed with water.

An aqueous solution containing potassium permanganate by 2%, acetic acid by 1% and sodium acetate hydrate by 0.5% and adjusted to a temperature of 45° C. was made ready in another tank, the pieces were immersed in this for 1 minute, thorouhly rinsed with water for 15 seconds, then put in a forced warm air dryer adjusted to a temperature of 90° C. for 10 minutes and dried. After drying, the copper wire was taken out of the magnesium alloy pieces placed on clean aluminum foil and the pieces were wrapped up together, then put in a plastic bag, sealed and stored. In this work, no fingers touched the surfaces to be joined (the ends on the opposite side from where the holes were made).

Three days later, the magnesium alloy pieces were taken out and, for each of them, the portion with the hole was grasped with a glove so that no oil or the like would adhere to and the piece was inserted into a metallic mold for injection molding adjusted to a temperature of 140° C. so that the planed side might be faced to the resin composition. The mold was closed and the PPS composition (1) obtained in Preparation Example 1 was injected at an injection temperature of 310° C. The mold was parted and 20 of the integrated composites shown in FIG. 2 were obtained. The size of the resin part was 22 mm×100 mm×3 mm and the joining face 6 measured 22 mm×7.5 mm (1.6 cm$^2$). Four of these products were subjected to a tensile breakage test on the day of molding and the average shear fracture strength was found to be 19.0 MPa. Also, the remaining composites were put in a forced hot air dryer with a temperature of 170° C. for 1 hour and annealed on the day of the molding, then one day later, five composites out of these were subjected to a tensile test and the average shear fracture strength was found to be 19.2 MPa.

In exactly the same manner as in Working Example 1, the remaining composites were clipped on the resin component and hung down, a commercially available silicon-based magnesium alloy chemical conversion treatment solution (Magtreat SI-5920; made by Meltex) was diluted according to the manufacturer's recommendation and the integrated composites were immersed for 1.5 minutes with the aqueous solution set to a temperature of 50° C., then rinsed with deionized water and dried for 15 minutes at a temperature of 90° C.

Two days later, the integrated composites were painted with the coating thickness set to 10 μm (paint: Omac/Black; made by Ohashi Chemical), dried for 1 hour at a temperature of 100° C. and then painted with Omac/Silver Metallic with the coating thickness set to 10 μm, after which these were baked for 30 minutes at a temperature of 170° C. Three days after having baked the coating, six scratches measuring 20 mm in length were made with a cutter knife at intervals of 2 mm in the paint film of each composite and then one more cut was made intersecting these six scratches. One week later, these composites were placed in a salt water spray tester. Using salt water with a concentration of 5%, salt water spraying was conducted for 24 hours at a temperature of 35° C., then the composites were rinsed with deionized water, wiped with a paper napkin and dried in air. The paint film on the side where the scratches had been made with the cutter knife had not lifted up and there was no spreading of rust from the scratches. These composites were subjected to a tensile break test and the shear fracture strength was found to be 18.5 MPa.

Working Example 8

AZ31B pieces were produced and stored following liquid treatment in exactly the same manner as in Working Example 1. One day later, the magnesium alloy pieces were taken out and each piece was inserted into a metallic mold for injection molding adjusted to a temperature of 140° C., the mold was closed and the PBT composition (1) obtained in Preparation Example 5 was injected at an injection temperature of 280° C. The mold was parted and 20 of the integrated composites shown in FIG. 2 were obtained. The size of the resin part was 10 mm×45 mm×5 mm and the joining face 6 measured 10 mm×5 mm (0.5 cm$^2$). These were put in a forced hot air dryer with a temperature of 150° C. for 1 hour and annealed on the day of the molding and one day later five of the composites were subjected to a tensile test. The average shear fracture strength was found to be 23.2 MPa.

In exactly the same manner as in Working Example 1, the remaining integrated composites were clipped on the resin component and hung down, the same Magtreat SI-5920 (made by Meltex) as used in Working Example 7 was diluted according to the manufacturer's recommendation and the integrated composites were immersed for 1.5 minutes with the aqueous solution set to a temperature of 50° C., then rinsed with deionized water and dried for 15 minutes at a temperature of 90° C. Two days later, the integrated composites were painted with the coating thickness set to 10 μm (paint: Omac/Black; made by Ohashi Chemical), dried for 1 hour at a temperature of 100° C. and then painted with Omac/Silver Metallic with the coating thickness set to 10 μm, after which these were baked for 30 minutes at a temperature of 170°C.

Three days after having baked the coating, scratches were made in the paint film of each composite with a cutter knife in exactly the same way as in Working Example 1 and the composites were placed in a salt water spray tester. Using salt water with a concentration of 5%, salt water spraying was conducted for 24 hours at a temperature of 35° C., then the composites were rinsed with deionized water and dried for 15 minutes at a temperature of 70° C. The paint film on the side where the scratches had been made with the cutter knife had not lifted up and there was no spreading of rust from the scratches. These composites were subjected to a tensile break test, and the shear fracture strength was found to be 21.0 MPa.

Working Example 9

An experiment was conducted in exactly the same manner as in Working Example 8, other than using the PBT composition (2) obtained in Preparation Example 6 instead of the PBT composition (1). Scratches were made in the painted product with a cutter knife and a salt water spray test was conducted, all in exactly the same manner as in Working Example 8. As a result, the paint film on the side where the scratches had been made with the cutter knife had lifted up very little and there was no spreading of rust from the scratches. These composites were subjected to a tensile break test and the shear fracture strength was found to be 19.3 MPa.

Working Example 10

An experiment was conducted in exactly the same manner as in Working Example 8, other than using the PBT composition (3) obtained in Preparation Example 7 instead of the PBT composition (1). Scratches were made in the painted product with a cutter knife and a salt water spray test was conducted, all in exactly the same manner as in Working Example 8. As a result, the paint film on the side where the scratches had been made with the cutter knife had lifted up very little and there was no spreading of rust from the scratches. These composites were subjected to a tensile break test and the shear fracture strength was found to be 19.5 MPa.

Working Example 11

AZ31B pieces were produced and stored following liquid treatment in exactly the same manner as in Working Example 1. One day later, the magnesium alloy pieces were taken out. Each piece was inserted into a metallic mold for injection molding adjusted to a temperature of 140° C., the mold was closed and the aromatic polyamide composition (1) obtained in Preparation Example 8 was injected at an injection temperature of 280° C. The mold temperature was 110° C. and 20 of the integrated composites shown in FIG. 2 were obtained. All of these were put in a forced hot air dryer with a temperature of 150° C. for 1 hour and annealed on the day of the molding, and one day later five of the composites were subjected to a tensile test. The average shear fracture strength was found to be 20.0 MPa.

After this, in exactly the same manner as in Working Example 10, the integrated composites were subjected to chemical conversion treatment, painted and baked and then three days after the baking, scratches were made in the paint film of each composite and a salt water spray test was conducted. As a result, the paint film on the side where the scratches had been made had not lifted up and there was no spreading of rust from the scratches. These composites were subjected to a tensile break test and the shear fracture strength was found to be 17.5 MPa.

What is claimed is:

1. A method for manufacturing a composite with high corrosion resistance, the method comprising:
    a step of forming a shaped part by machining a magnesium part or magnesium alloy part from a casting or an intermediate material;
    a step of immersing and chemically etching said shaped part in an acidic aqueous solution;
    a step of immersing said chemically etched shaped part in an aqueous solution containing a permanganate and forming on the surface thereof a thin layer having manganese oxide as a component; and
    a step of inserting said shaped part, on which the thin layer has been formed, into a metallic mold for injection molding and injecting a resin composition into said mold to integrally join said shaped part and resin composition, said resin composition being selected out of:
    a resin composition comprising a resin component including polyphenylene sulfide by 70 to 97 wt % and polyolefin resin by 3 to 30 wt %,
    a resin composition comprising a resin component including polybutylene terephthalate resin by 70 to 97 wt % and polyethylene terephthalate resin and/or polyolefin resin by 3 to 30 wt % and
    a resin composition comprising a resin component including as the main component an aromatic polyamide resin containing both a polyamide obtained from hexamethyldiamine and isophthalic acid and a polyamide obtained from hexamethylenediamine and terephthalic acid.

2. A method for manufacturing a composite with high corrosion resistance, the method comprising:
    a step of forming a shaped part by machining a magnesium part or magnesium alloy part from a casting or an intermediate material;
    a step of immersing and chemically etching said shaped part in an acidic aqueous solution;

a step of immersing said chemically etched shaped part in an aqueous solution containing a permanganate and forming on the surface thereof a thin layer having manganese oxide as a component;

a step of inserting the shaped part, on which the thin layer has been formed, into a metallic mold for injection molding and injecting a resin composition into said mold to integrally affix said shaped part and resin composition, said resin composition being selected out of:

a resin composition comprising a resin component including polyphenylene sulfide by 70 to 97 wt % and polyolefin resin by 3 to 30 wt %, a resin composition comprising a resin component including polybutylene terephthalate resin by 70 to 97 wt % and polyethylene terephthalate resin and/or polyolefin resin by 3 to 30 wt % and a resin composition comprising a resin component including as the main component an aromatic polyamide resin containing both a polyamide obtained from hexamethyldiamine and isophthalic acid and a polyamide obtained from hexamethylenediamine and terephthalic acid; and a step of subjecting said integrally affixed shaped part and resin composition to a chemical conversion treatment by immersing the same in a magnesium alloy chemical conversion treatment solution.

3. A method for manufacturing a composite with high corrosion resistance, the method comprising:

a step of forming a shaped part by machining a magnesium part or magnesium alloy part from a casting or an intermediate material;

a step of immersing and chemically etching said shaped part in an acidic aqueous solution;

a step of immersing said chemically etched shaped part in an aqueous solution containing a permanganate and forming on the surface thereof a thin layer having manganese oxide as a component;

a step of inserting the shaped part, on which the thin layer has been formed, into a metallic mold for injection molding and injecting a resin composition into said mold to integrally affix said shaped part and resin composition, said resin composition being selected out of:

a resin composition comprising a resin component including polyphenylene sulfide by 70 to 97 wt % and polyolefin resin by 3 to 30 wt %, a resin composition comprising a resin component including polybutylene terephthalate resin by 70 to 97 wt % and polyethylene terephthalate resin and/or polyolefin resin by 3 to 30 wt % and a resin composition comprising a resin component including as the main component an aromatic polyamide resin containing both a polyamide obtained from hexamethyldiamine and isophthalic acid and a polyamide obtained from hexamethylenediamine and terephthalic acid; and a step of subjecting said integrally affixed shaped part and resin composition to a chemical conversion treatment by immersing the same in a manganese phosphate-based or silicon-based magnesium alloy chemical conversion treatment solution.

* * * * *